(12) United States Patent
Moriyama et al.

(10) Patent No.: US 11,126,519 B2
(45) Date of Patent: Sep. 21, 2021

(54) MONITORING DEVICE, MONITORING METHOD AND NON-TRANSITORY STORAGE MEDIUM

(71) Applicant: Kabushiki Kaisha Toshiba, Tokyo (JP)

(72) Inventors: Takuro Moriyama, Tokyo (JP); Gaku Ishii, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 400 days.

(21) Appl. No.: 16/128,795

(22) Filed: Sep. 12, 2018

(65) Prior Publication Data

US 2019/0205234 A1 Jul. 4, 2019

(30) Foreign Application Priority Data

Jan. 4, 2018 (JP) .............................. JP2018-000286

(51) Int. Cl.
| | |
|---|---|
| *G06F 11/263* | (2006.01) |
| *G06F 17/16* | (2006.01) |
| *G06N 20/00* | (2019.01) |
| *G06K 9/62* | (2006.01) |
| *G06N 5/00* | (2006.01) |

(Continued)

(52) U.S. Cl.
CPC ............ *G06F 11/263* (2013.01); *G06F 17/16* (2013.01); *G06K 9/6257* (2013.01); *G06K 9/6282* (2013.01); *G06K 9/6284* (2013.01); *G06N 5/003* (2013.01); *G06N 5/045* (2013.01);

(Continued)

(58) Field of Classification Search
CPC ...... G06F 11/263; G06F 21/554; G06F 21/55; G06N 20/00; G06N 20/20
See application file for complete search history.

(56) References Cited

U.S. PATENT DOCUMENTS

| | | | |
|---|---|---|---|
| 7,640,126 B2 | 12/2009 | Fujii | |
| 9,116,965 B2 | 8/2015 | Callan | |

(Continued)

FOREIGN PATENT DOCUMENTS

| | | |
|---|---|---|
| JP | H7-181097 A | 7/1995 |
| JP | 2004-169989 A | 6/2004 |

(Continued)

OTHER PUBLICATIONS

Hayes et al., "Contextual Anomaly Detection in Big Sensor Data," in Proc. of the 3rd Int. Congress on Big Data, Jun. 27-Jul. 2, 2014, Anchorage, Alaska, USA, 9 pages.

(Continued)

*Primary Examiner* — Jigar P Patel
(74) *Attorney, Agent, or Firm* — Finnegan, Henderson, Farabow, Garrett & Dunner L.L.P.

(57) ABSTRACT

According to one embodiment, a monitoring device includes a variable selector and an anomaly detector. The variable selector is configured to select context variables which indicate conditions when content variables were obtained based on values of the content variables and values of the context variables included in base data, and values of the content variables and values of the context variables included in target data. The anomaly detector is configured to detect anomalies in the target data using the context variables which were selected by the variable selector.

19 Claims, 8 Drawing Sheets

(51) Int. Cl.
    *G06N 5/04* (2006.01)
    *G06N 20/20* (2019.01)
    *G06N 3/04* (2006.01)
(52) U.S. Cl.
    CPC ............ *G06N 20/00* (2019.01); *G06N 20/20* (2019.01); *G06N 3/0454* (2013.01)

(56) References Cited

U.S. PATENT DOCUMENTS

| | | | | |
|---|---|---|---|---|
| 10,354,760 | B1* | 7/2019 | Goodall | G16H 50/80 |
| 2007/0112598 | A1* | 5/2007 | Heckerman | G16H 50/20 705/2 |
| 2008/0201299 | A1* | 8/2008 | Lehikoinen | G06F 16/48 |
| 2012/0041575 | A1 | 2/2012 | Maeda et al. | |
| 2014/0195184 | A1 | 7/2014 | Maeda et al. | |
| 2016/0278706 | A1 | 9/2016 | Okamoto et al. | |
| 2016/0328654 | A1* | 11/2016 | Bauer | G06N 5/048 |
| 2019/0018402 | A1 | 1/2019 | Enomoto et al. | |

FOREIGN PATENT DOCUMENTS

| | | |
|---|---|---|
| JP | 2006-319220 A | 11/2006 |
| JP | 2008-276537 A | 11/2008 |
| JP | 2010-191556 A | 9/2010 |
| JP | 2013-41448 A | 2/2013 |
| JP | 2013-196698 A | 9/2013 |
| JP | 2014-186402 A | 10/2014 |
| JP | 2015-76058 A | 4/2015 |
| JP | 5956094 B1 | 7/2016 |
| JP | 2017-120504 A | 7/2017 |
| WO | WO 2017/011734 A1 | 1/2017 |

OTHER PUBLICATIONS

Song et al., "Conditional Anomaly Detection," IEEE Transactions on Knowledge and Data Engineering, (May 2007), pp. 1-14.
Gregorutti et al., "Correlation and variable importance in random forests," arXiv:1310.5726v5 [stat.ME] (Apr. 18, 2016), pp. 1-31.

* cited by examiner

CONTEXT DATA

| TIME | SWITCH-A | CIRCUIT BLOCK-B | |
|---|---|---|---|
| 0:00 | 0 (NO OPERATION) | 0 (OFF) | |
| 0:01 | 1 (PUSHED) | 0 (OFF) | |
| 0:02 | 0 (NO OPERATION) | 0 (OFF) | |
| 0:03 | 0 (NO OPERATION) | 0 (OFF) | |
| 0:04 | 0 (NO OPERATION) | 1 (ON) | |
| 0:05 | 0 (NO OPERATION) | 1 (ON) | |
| 0:06 | 0 (NO OPERATION) | 0 (OFF) | |
| ⋮ | ⋮ | ⋮ | |

FIG.2

CONTEXT DATA $m$

| TIME | CONFIGURED TEMPERATURE | AMBIENT TEMPERATURE | WEATHER | |
|---|---|---|---|---|
| 10:00 | 27°C | 33.6°C | 0 (SUNNY) | |
| 11:00 | 25°C | 33.8°C | 0 (SUNNY) | |
| 12:00 | 25°C | 34.2°C | 0 (SUNNY) | |
| 13:00 | 25°C | 35.0°C | 0 (SUNNY) | |
| 14:00 | 25°C | 35.4°C | 1 (CLOUDY) | |
| 15:00 | 25°C | 27.9°C | 2 (RAINY) | |
| 16:00 | 25°C | 26.1°C | 2 (RAINY) | |
| 17:00 | 25°C | 24.7°C | 2 (RAINY) | |
| ⋮ | ⋮ | ⋮ | ⋮ | |

CONTENT DATA $l$

| TIME | ROOM TEMPERATURE | POWER CONSUMPTION | |
|---|---|---|---|
| 10:00 | 30.3°C | 310W | |
| 11:00 | 28.9°C | 350W | |
| 12:00 | 27.8°C | 340W | |
| 13:00 | 28.1°C | 330W | |
| 14:00 | 28.3°C | 335W | |
| 15:00 | 28.2°C | 330W | |
| 16:00 | 27.4°C | 290W | |
| 17:00 | 26.9°C | 285W | |
| ⋮ | ⋮ | ⋮ | |

DATA PREPROCESSING RESULT

FOLLOWING VARIABLES ARE REMOVED

CONTEXT VARIABLES — *VOICE NOTIFICATION FEATURE, HUMIDIFIER, ENABLE/DISABLE OF VENTILATION FEATURE*

CONTENT VARIABLES — *ROOM NOISE, ROOM $CO_2$ CONCENTRATION*

RESULT OF CONTEXTUAL ANOMALY DETECTION

ROOM TEMPERATURE ANOMALY DETECTED IN 2PM AUGUST 4, 2018.
PLEASE INSPECT AIR CONDITIONER #1234.

FIG.6

MONITORING DEVICE, MONITORING METHOD AND NON-TRANSITORY STORAGE MEDIUM

CROSS-REFERENCE TO RELATED APPLICATIONS

This application is based upon and claims the benefit of priority from Japanese Patent Application No. 2018-000286, filed on Jan. 4, 2018; the entire contents of which are hereby incorporated by reference.

FIELD

Embodiments described herein relate generally to a monitoring device, a monitoring method and a non-transitory storage medium.

BACKGROUND

The use of contextual anomaly detection techniques improves the accuracy of anomaly detection. In contextual anomaly detection, variables that are target of anomaly detection and the variables which represent the condition and the background when the variables were measured are distinguished and treated differently. Moreover, if training data includes a sufficient number of samples and the training data is labeled with attributes indicating normal or abnormal states, it is possible to select and use only the variables which contribute to anomaly detection, improving the accuracy of anomaly detection.

However, there are cases when only data for the normal state is available. Such cases happen when the number of available training samples is insufficient or the occurrence rate of abnormal events is low. In such cases, it is not possible to select the variables which contribute to anomaly detection because the contributions cannot be evaluated. To improve accuracy of contextual anomaly detection in cases when only data for the normal state is available, further technological development is necessary.

BRIEF DESCRIPTION OF THE DRAWINGS

FIG. 2 is a table including an example of context data;
FIG. 4 is a table including an another example of context data;
FIG. 5 is a table including an another example of content data;
FIG. 6 is a diagram of results shown on a display.

DETAILED DESCRIPTION

According to one embodiment, a monitoring device includes a variable selector and an anomaly detector. The variable selector is configured to select context variables which indicate conditions when content variables were obtained based on values of the content variables and values of the context variables included in base data, and values of the content variables and values of the context variables included in target data. The anomaly detector is configured to detect anomalies in the target data using the context variables which were selected by the variable selector.

Hereinafter, embodiments of the present invention will be described with reference to the drawings.

First Embodiment

Figure 1:
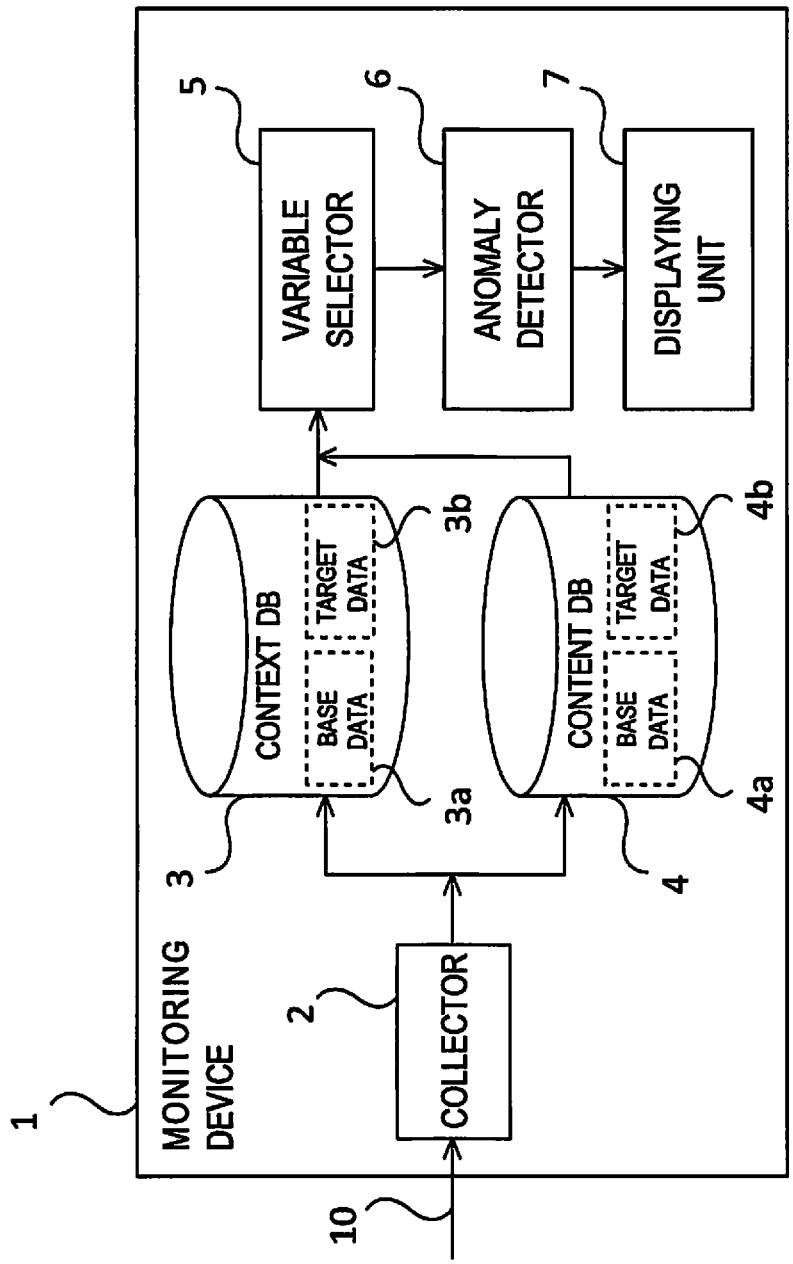
FIG. 1 is a block diagram of a monitoring device in accordance with a first embodiment.

FIG. 1 is a block diagram showing a schematic configuration of a monitoring device according to a first embodiment. A monitoring device according to a first embodiment will be described with reference to FIG. 1.

First, the overview of the monitoring device according to the embodiment is described. FIG. 1 shows a monitoring device 1. The monitoring device 1 executes contextual anomaly detection based on data. In the following, a case when values measured from physical sensors are used as the data is explained. However, in other embodiments, the data is marketing data, economic indicators, log data from IT systems or clinical data. The type of data used is not limited.

The monitoring device 1 categorizes variables included in the data to content variables and context variables. Then, the monitoring device 1 executes contextual anomaly detection. Content variables are target variables of anomaly detection. Context variables are variables which indicate the conditions, situations and the background the content variables were obtained.

In one embodiment, the monitoring device 1 uses only some of the variables in the data for anomaly detection, for the sake of improving accuracy of contextual anomaly detection. Selection of variables is executed in data preprocessing steps before execution of anomaly detection. In one embodiment, selection of variables is executed for only the context variables. In another embodiment, selection of variables is executed for both the context variables and the content variables.

Before selecting variables, the monitoring device prepares base data and target data. The base data is data obtained when the monitored target is assumed to be in normal state. The target data is data obtained during the target period of anomaly detection. Both the base data and the target data include content variables and context variables.

Variables used for anomaly detection are selected based on the degree of contribution in distinguishing the base data between the target data. In the following, the degree of contribution in distinguishing the base data between the target data is called the contribution score. The contribution score is calculated by using classifiers such as random forest. In one embodiment, selection of variables is executed by using statistical tests.

When the selection of variables for the context variables is executed, the variables with the smaller contribution scores are selected. When the selection of variables for content variables is executed, the variables with the larger contribution scores are selected.

Finally, the monitoring device 1 executes contextual anomaly detection by using the selected variables. In one embodiment, the result of contextual anomaly detection is shown on displays. Thus, it is possible to review the results of anomaly detection and execute maintenance of the devices.

Next, the components of the monitoring device 1 are described.

The monitoring device 1 in FIG. 1 includes a collector 2, a context database (context DB) 3, a content database (content DB) 4, a variable selector 5, an anomaly detector 6 and a displaying unit 7. The context database 3 includes base data 3*a* and target data 3*b*. The content database 4 includes base data 4*a* and target data 4*b*.

The collector 2 collects data from external devices or systems. The data collected by the collector 2 is saved in the context database 3 or the content database 4. The collector 2 is connected to external devices or systems via a telecommunications line 10. In one embodiment, the telecommunications network 10 is a wired communication media. In another embodiment, the telecommunications network uses wireless communication media. Examples of wired communication media include optical fibers, LAN cables, telephone lines, coaxial cables or the like. However, the type of media is not limited. Communication standards used by the collector 2 include, Ethernet, wireless LAN, PCI Express, USB, UART, SPI, SDIO, serial ports and Bluetooth. However, the type of standard is not limited.

Examples of external devices include, air conditioners, manufacturing equipment, electric power generators, various machinery, moving bodies, electronic devices, observational instruments and communication terminals. However, the type of external device is not limited. Examples of data collected from external devices include measured values of sensors. However, the type of data is not limited. Measured values of sensors include physical values, configured values and status information.

Examples of external systems include sensor networks, database servers, web servers and web services. However, the type of system is not limited.

The collector 2 saves the context variables in the collected data to the context database 3. Also, the collector 2 saves the content variables in the collected data to the content database 4. In one embodiment, external devices assign labels to each variable to ensure that whether the corresponding variable is a context variable or a content variable is identifiable.

In one embodiment, the collector 2 categorizes each variable to context variables or content variables. Categorization of variables is executed by applying pattern matching or natural language processing to names assigned to sensors or names assigned to data series. For example, variables including the character strings "config" or "status" are likely to be related to configuration of devices or status information of devices. Thus, such variables are categorized as context variables. In another embodiment, metadata of each sensor are analyzed to categorize variables. The format of metadata is not limited.

In one embodiment, data obtained from a specific source only includes a single type of variable. In such cases, categorization based on the source address or source identifier is used. For example, in anomaly detection of air conditioners, external temperature and the weather are variables which indicate the operating conditions of the air conditioners. Since variables which indicate the condition are context variables, all the variables obtained from the domain name or the IP address of the servers which provide weather information is categorized as context variables. It is possible to execute all or part of the configuration related to categorization of variables manually. If unique identifiers such as sensor IDs are assigned to the sensors or data series, it is possible to execute classification by using the identifiers.

Figure 3:
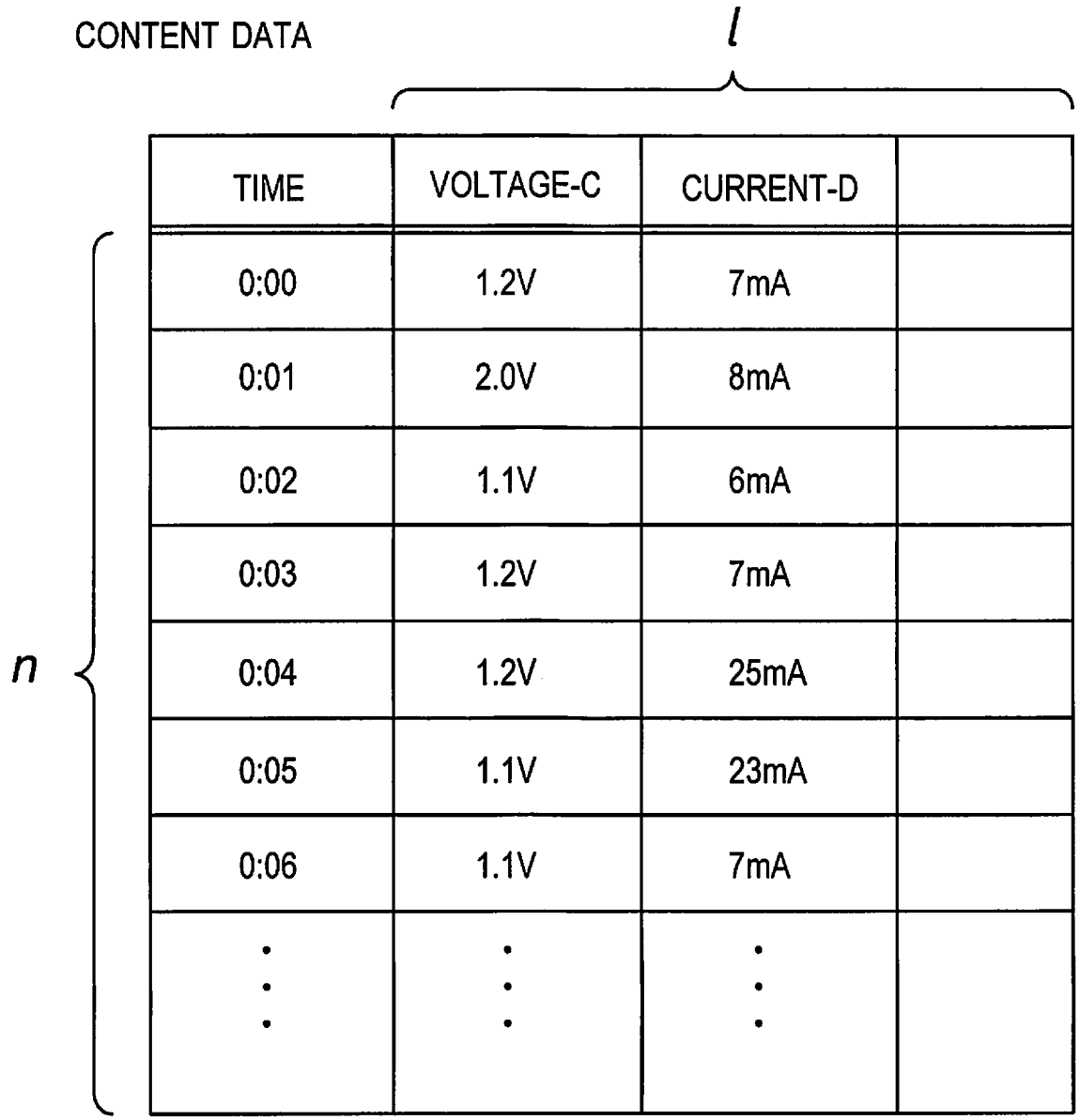
FIG. 3 is a table including an example of content data.

FIG. 2 to FIG. 5 are examples of data collected by the collector 2. Tables in FIG. 2 and FIG. 3 include the values of variables in each measured time. In FIG. 2 and FIG. 3, the measured time is represented in "hours:minutes" format. However, the time data may include information in units of years, months, seconds or milliseconds. In FIG. 2 and FIG. 3, values of variables in different times are stored. Each row in the tables of FIG. 2 and FIG. 3 are sets of variables in the same measured time. In the following, the set of variables obtained in the same time are called "record". The tables of FIG. 2 and FIG. 3 include n records.

FIG. 2 includes values of sensors in the status information of an electronic device. FIG. 3 includes values of physical sensors in an electronic device. The table in FIG. 2 includes information such as the operating conditions of switch A and the power condition of the circuit block B. Thus, the table in FIG. 2 corresponds to the context data. The context data in FIG. 2 includes m context variables. The table in FIG. 3 includes information such as the voltage C and the current D which are used to determine whether the operation of the electronic device is normal or not. Thus, the table in FIG. 3 corresponds to the content data. The content data in FIG. 3 includes l (lower case of L) content variables.

Referring to the content data of FIG. 3, the voltage C is 2.0V in 0:01. This value is apparently higher compared to the other values measured in different times. However, referring to the context data of FIG. 2, it can be confirmed that the switch A is pressed in 0:01. Therefore, it is likely that the peak in measured voltage detected in 0:01 is due to operation of the switch, rather than abnormal behavior of the electronic device.

Referring to the content data of FIG. 3, the current D is 25 mA in 0:04 and 23 mA in 0:05. These values are higher compared to the other measured values which are around 7 mA to 8 mA. However, referring to the context data of FIG. 2, the circuit block B which was OFF in other timings was turned ON in 0:04 and 0:05. Therefore, it is likely that the increase of current is caused due to changes in the impedance of the circuit by the power condition of the circuit block B, not abnormal behavior of the electronic device.

Thus, by using data which is classified into context variables and content variables, it is possible to execute contextual anomaly detection of electronic devices.

FIG. 4 and FIG. 5 are data collected to monitor air conditioners in a building. In the tables of FIG. 4 and FIG. 5, values of the variables are stored for each measured time. In FIG. 4 and FIG. 5, the measured time is represented in "hours:minutes" format. However, the time data may include information in units of years, months, seconds or milliseconds. The tables of FIG. 4 and FIG. 5 include n records.

The table in FIG. 4 includes the target temperature of an air conditioner, external temperature measured in a meteorological station which is in the vicinity of the building and the weather observed in a meteorological station which is in the vicinity of the building. Since these values indicate the configuration and the operating condition of the air conditioner, FIG. 4 corresponds to the context data. Although not illustrated in FIG. 4, the configuration of operating modes is classified as context variables. Examples of the configuration in operating modes include automatic operation, cooling mode, heating mode and dehumidifier mode.

The table in FIG. 5 includes the temperature of the room where the air conditioner is installed and the consumption of electric power by the air conditioner. These variables can be used for detecting anomalies of the air conditioner. For example, if the air conditioner is in cooling operation with significant consumption of electric power but the room temperature is high, failure of the air conditioner is suspected. Thus, the table in FIG. 5 includes content data.

In the content data of FIG. 5, the consumption of electric power which was 310 W in 10:00 is increasing to 350 W in 11:00. However, referring to the context data in FIG. 4, the target temperature which was 27 degrees Celsius in 10:00 is lowered to 25 degrees Celsius in 11:00. Thus, it is likely that the increase in the consumption of electric power in 11:00 is caused by the lower target temperature for cooling, not abnormal behavior of the device.

Also, the consumption of electric power which was 330 W in 15:00 is decreasing to 290 W in 16:00. Despite the decrease in consumption of electric power, the room temperature which was 28.2 degrees Celsius in 15:00 is decreasing to 27.4 degrees Celsius in 16:00. In 17:00, the room temperature is 26.9 degrees Celsius while the consumption of electric power is 285 W. Thus, despite the decrease in consumption of electric power, the room temperature is becoming even lower.

It is known that the consumption of electric power of an air conditioner in cooling operation has a negative correlation to the room temperature. Therefore, in the data of FIG. 5, the behaviors of the variables are different from the generally anticipated trends.

Referring to the context data in FIG. 4, the weather is changing from sunny to cloudy in 14:00. In 15:00, the weather is changing from cloudy to raining. Regarding the external temperature, it was 35.4 degrees Celsius in 14:00. However, the external temperature changes to 27.9 degrees Celsius, then decreases to 26.1 degrees Celsius and finally decreases to 24.7 degrees Celsius.

The weather in the area surrounding the building was intensely hot until lunch time. However, in the afternoon, the weather in the area worsened and the ambient temperature of the building became lower, while the target temperature of the air conditioner was 25 degrees Celsius. In such cases, it is possible to have lower consumption of electric power in air conditioners along with lower room temperatures. Thus, it is likely that there are no anomalies of air conditioners in this case.

As shown in the examples of FIG. 2 to FIG. 5, it is possible to improve the accuracy of anomaly detection if the variables included in the data are categorized into context variables and content variables.

The context database 3 stores context data which includes the values of the context variables in each measured time. FIG. 2 and FIG. 4 above are examples of the context data. In one embodiment, the context data is saved in tables prepared for each device or system. In another embodiment, the context data is saved in the same table. If the context data of a plurality of devices and systems are saved in the same table, identifiers which indicate the corresponding device or system are assigned to each variable.

The context data is divided into the base data 3a and the target data 3b. For example, the context data used as the base data and the context data used as the target data are stored in different tables. In another embodiment, the context data used as the base data and the context data used as the target data are stored in a same table. In this case, the starting time of the base data, the ending time of the base data, the starting time of the target data and the ending time of the target data are managed to ensure that the base data and the target data are distinguishable.

The base data is data which is obtained in the period when the monitored device or system is assumed to be normal state. The examples of the period are as follows: the period immediately after the maintenance of the device, the period immediately after the calibration of sensors and the period after the initial high failure-rate periods in the so-called "bathtub curve".

The number of records in the base data is determined based on the method of contextual anomaly detection used by the anomaly detector 6.

The target data is obtained from periods which are different from the base data. Anomalies of the monitored device or system in the periods corresponding to the target data are detected by the base data and the anomaly detector 6. The number of records included in the target data is determined based on the method of contextual anomaly detection used in the anomaly detector 6.

The content database 4 stores content data which are the values of the content variables in each measured time. The FIG. 3 and FIG. 5 above are examples of content data. In one embodiment, the content data is saved in tables prepared for each device or system. In another embodiment, the content data is saved in the same table. If the content data of a plurality of devices and systems are saved in the same table, identifiers which indicate the corresponding device or system are assigned to each variable.

The content data also includes the base data 4a and the target data 4b. In one embodiment, the content data used as the base data and the content data used as the target data are stored in the same table. In another embodiment, the content data used as the base data and the content data used as the target data are stored in different tables.

In one embodiment, the context data and the content data are stored in different tables. In another embodiment, the context data and the content data are stored in the same table. If the context data and the content data are stored in the same table, identifiers which show the category of the data are assigned to each variable. In above, the formats used for saving different data were explained. As long as the context data and the content data can be handled as matrices, any type of format can be used.

The variable selector 5 calculates the contribution score (the degree of contribution in distinguishing the base data between the target data) of the variables included in the base data and the target data. Then, based on the calculated contribution scores, the variable selector 5 selects variables used in contextual anomaly detection executed by the anomaly detector 6. The anomaly detector 6 executes contextual anomaly detection by using variables selected by the variable selector 5. Context variables with relatively large contribution scores are not used in contextual anomaly detection. In the first embodiment, the variable selector 5 selects all the content variables for contextual anomaly detection.

If the values and the behavior of a context variable are differ greatly in the base data and the target data, the contribution score of the corresponding context variable becomes large. If the contribution score of the context variable is large, it is assumed that the base data and the target data were obtained in different conditions, situations or backgrounds (contexts).

A basic assumption of contextual anomaly detection is that different contexts make contents different. If contextual anomaly detection is executed including context variables which are behaving differently between the base data and the target data, the behaviors of content variables which come from anomalies are not sufficiently considered in the process of anomaly detection. Therefore, the possibility of false positives and false negatives in anomaly detection increases. In order to increase the accuracy of contextual anomaly detection, the base data and the target data need to share common contexts. In one embodiment, the sharing of common contexts between the base data and the target data is achieved by removing context variables with larger contribution scores from the process of contextual anomaly detection.

Next, the variable selection process is described. The variable selection process involves matrix computation. In the following description, if merely a "data" is referred, the data includes both the content data and the context data. If merely a "variable" is referred, the variable includes both the content variable and the context variable. First, the expression used in the description is explained.

The context data in each time is expressed using a vector in the following equation (1).

$$X = (b_1, b_2, b_3, \ldots, b_m) \tag{1}$$

Each "b" above corresponds to context variables. They represent the configured values and measured values which indicate the conditions, situations and backgrounds. The vector represented by equation (1) includes m context variables ($b_1$-$b_m$). The vector represented by equation (1) corresponds to the records in FIG. 2 and FIG. 4.

In the variable selection process, data is classified into base data and target data depending on the usage. To distinguish base data and target data, indexes are added to the vectors. The index "a" is added to the vectors representing base data. The index "h" is added to the vectors representing target data. Thus, vectors representing base data and target data are distinguished by using the notation represented in (2) below.

$$X_a = (b_1, b_2, b_3, \ldots, b_m)$$

$$X_h = (b_1, b_2, b_3, \ldots, b_m) \tag{2}$$

Here, the pairs of variables $b_{a1}$ and $b_{h1}$, $b_{a2}$ and $b_{h2}$ are both the same context variables. However, to clarify the fact that the variables are obtained in different periods, different indexes "a" and "h" are used.

The data includes the values of variables obtained in different times. In order to distinguish the (values of) context variables obtained in different times, more indexes are added. The following equation (3) represents vectors including the (values of) context variables obtained in different times.

$$X_{\{1,a\}}, X_{\{2,a\}}, X_{\{3,a\}}, \ldots, X_{\{n_a,a\}}$$

$$X_{\{1,h\}}, X_{\{2,h\}}, X_{\{3,h\}}, \ldots, X_{\{n_h,h\}} \tag{3}$$

The number in the indexes {1, a}, {2, a}, {3, a}, {1, h}, {2, h} and {3, h} indicate the time when each value of the variables was obtained. Referring to the index {$n_a$, a} in the equation (3), the base data includes $n_a$ records, each obtained from different times. Also referring to the index {$n_h$, h} in the equation (3), the target data includes $n_h$ records, each obtained from different times.

Next, the variable selection process according to the first embodiment is explained, using the expressions described above.

A plurality of records including context variables used as the base data is represented using a $n_a$ by m matrix $X_a$ described in equation (4) below.

$$X_a = \begin{bmatrix} x_{\{1,a\}} \\ x_{\{2,a\}} \\ \vdots \\ x_{\{n_a,a\}} \end{bmatrix} \in R^{n_a \times m} \tag{4}$$

Also, a column vector $Y_a$ with $n_a$ dimensions described in equation (5) below is used. In the vector $Y_a$, all the elements are 1.

$$Y_a = \begin{bmatrix} 1 \\ 1 \\ \vdots \\ 1 \end{bmatrix} \in R^{n_a} \tag{5}$$

Similar to the equation (4), a plurality of records including context variables used as the target data is represented using $n_h$ by m matrix $X_h$ described in equation (6) below.

$$X_h = \begin{bmatrix} x_{\{1,h\}} \\ x_{\{2,h\}} \\ \vdots \\ x_{\{n_h,h\}} \end{bmatrix} \in R^{n_h \times m} \tag{6}$$

Also, a column vector $Y_h$ with $n_h$ dimensions described in equation (7) below is used. In the vector $Y_h$, all the elements are 0.

$$Y_h = \begin{bmatrix} 0 \\ 0 \\ \vdots \\ 0 \end{bmatrix} \in R^{n_h} \tag{7}$$

Next, the matrix $X_a$ and the matrix $X_h$ are concatenated along the row direction, generating a matrix $X_c$ described in the following equation (8).

$$X_c = \begin{bmatrix} \vec{x}_{\{1,a\}} \\ \vec{x}_{\{2,a\}} \\ \vdots \\ \vec{x}_{\{n_a,a\}} \\ \vec{x}_{\{1,h\}} \\ \vec{x}_{\{2,h\}} \\ \vdots \\ \vec{x}_{\{n_h,h\}} \end{bmatrix} \in R^{(n_a+n_h) \times m} \tag{8}$$

Then, the column vectors $Y_a$ and $Y_h$ are concatenated to generate a vector $Y_c$ described in the equation (9) below.

$$Y_c = \begin{bmatrix} 1 \\ 1 \\ \vdots \\ 0 \\ 0 \end{bmatrix} \in R^{(n_a+n_b)} \tag{9}$$

When the matrix $X_c$ and the vector $Y_c$ are prepared, the contribution score of each context variable is calculated. In the calculation, the matrix $X_c$ is used as the explanatory variable. The vector $Y_c$ is used as the response variable. The contribution score is calculated by using classifiers such as random forest. If random forest are used, the variable importance corresponds to the contribution score.

In random forest, a process which generates bootstrap samples and a process which generates a decision tree using the generated bootstrap samples are repeated. In the process generating bootstrap samples, records are selected randomly while allowing duplicate selections from the training data. Approximately 36% of the records in the training data (oob data:out-of-bag data) is not used for the generation of a decision tree.

The variable importance known as permutation importance is calculated by using the oob data. In the following, the process for calculating the permutation importance of the i-th variable is described. First, each oob data is applied to the corresponding tree and the ratio of correct classifications is calculated. Next, the values of the i-th variables are permutated in the oob data. Then, each oob data after the permutation is applied to the corresponding tree and the ratio of correct classifications is calculated. Moreover, the difference in the ratio of correct classifications of the oob data before and after the permutation is calculated for each tree. The permutation importance of the i-th variable is defined as the mean of difference in the ratio for all the trees in the forest. If the permutation importance of the i-th variable is large, it is assumed that the importance of the i-th variable is large in the classification process.

In one embodiment, the normalization such as z-score normalization is applied to the training data.

In one embodiment, the variable importance is calculated based on Gini impurity. When the distribution of labels in data are more random, the Gini impurity of the data becomes higher. If random forest is used, it is possible to calculate Gini impurity for each node of a tree in the forest. If there are significant decrease in Gini impurity between a node and its child nodes, it is assumed that the variable used for the "decision" at the node contributes to the classification process largely. Thus, it is possible to use Gini impurity as the variable importance. Gini importance is an example of indicators of the variable importance based on Gini impurity.

In above, a case when random forest is used as the classifier was explained. However, this is only an example. For example, in one embodiment, classification is executed by using other ensemble learning methods such as Adaboost. Any type of algorithm which is applicable for classification tasks can be used. Also, in another embodiment, an indicator other than the ones based on the Gini impurity and the permutation importance is used as the contribution score.

If the contribution score is calculated for each context variable, the contribution score of each context variable is compared with a threshold value. If the contribution score of the context variable is greater than the threshold value, the corresponding context variable is excluded from contextual anomaly detection by the anomaly detector 6. On the other hand, if the contribution score of the context variable is equal to or less than the threshold value, the corresponding context variable is selected to be used in contextual anomaly detection by the anomaly detector 6. The threshold value can be determined in any way. For example, in one embodiment, the average value of the contribution scores of the context variables is used as the threshold value.

By executing the process described above, the variable selection process is completed. In one embodiment, the variable selector 5 saves information on the excluded context variables or the information on the selected context variables into a storage 105. In one embodiment, the variable selector 5 transmits information on the excluded context variables or the selected context variables to the anomaly detector 6. The anomaly detector 6 executes contextual anomaly detection without the excluded context variables. Since all the content variables are selected in the first embodiment, the anomaly detector 6 uses all the content variables during contextual anomaly detection.

The anomaly detector 6 executes contextual anomaly detection based on the variables that were selected in the variable selector 5. The anomaly detector 6 executes contextual anomaly detection of the target data on the basis of the base data. The base data includes both the context variables and content variables. The target data also includes both the context variables and content variables. If normalization of data or learning is necessary before execution of contextual anomaly detection, the anomaly detector 6 executes the processes before contextual anomaly detection.

In one embodiment, the anomaly detector 6 builds a model of the base data and calculates how the target data deviates from the model. The data obtained during the anomaly state is supposed to deviate from the model, which means that it is possible to use the deviation from the model as an indicator of anomaly.

In one embodiment, autoencoder, which is a type of neural network, is used to build a model of the base data. An anomaly indicator of the target data when the autoencoder is used is the reconstruction error of the target data which is derived from the autoencoder trained using the base data.

Another model of the base data is the probability density of the base data. If the probability density of the target data deviates from the one of the base data, the target data is supposed to have an anomaly on the basis of the base data. Thus, in one embodiment, the ratio between the probability density of the base data and the probability density of the target data is used as an anomaly indicator of the target data. Techniques to estimate the ratio of probability densities are known as "Density Ratio Estimation" in machine learning.

The aforementioned methods which use the autoencoder and the density ratio are only examples of the contextual anomaly detection executed by the anomaly detector 6. Thus, it is possible to employ other methods for contextual anomaly detection executed by the anomaly detector 6. The anomaly detector 6 saves the result of contextual anomaly detection to the storage 105. Examples of the formats used for saving the results of contextual anomaly detection include text, binary, CSV and XML. However, the type of format used is not limited. If the results of contextual anomaly detection are saved in formats convertible to texts and graphics, the displaying unit 7 can display the results graphically.

The displaying unit 7 converts the results of contextual anomaly detection generated by the anomaly detector 6 to graphic data or text data in specified formats. Then, the displaying unit 7 transmits the converted data to a display 103. In one embodiment, the display 103 displays the data preprocessing results besides the results of contextual anomaly detection.

FIG. 6 is a diagram of results shown on a display. FIG. 6 includes the results of contextual anomaly detection and the data preprocessing results. Since the example in FIG. 6 is the content displayed when contextual anomaly detection is applied to air conditioners, a message which suggests the maintenance of the air conditioner is shown. The monitoring device according to the embodiment is applicable to any type of device and system. Thus, depending on the type of device and system, the content of the messages is modified.

For example, if DoS attacks, malwares, intrusions to information systems are detected by contextual anomaly detection, messages which indicates attacks to the information system is displayed. Also, it is possible to display messages which indicate isolation of the network by security software or appliances, termination of functions, closing of ports and shutting access to the system.

Next the hardware configuration of the monitoring device according to the embodiment is described. The monitoring device according to the embodiment is configured with a computer 100. The computer 100 includes information processing devices such as servers, client devices, microprocessors, tablets, personal computers and general purpose computers.

Figure 7:
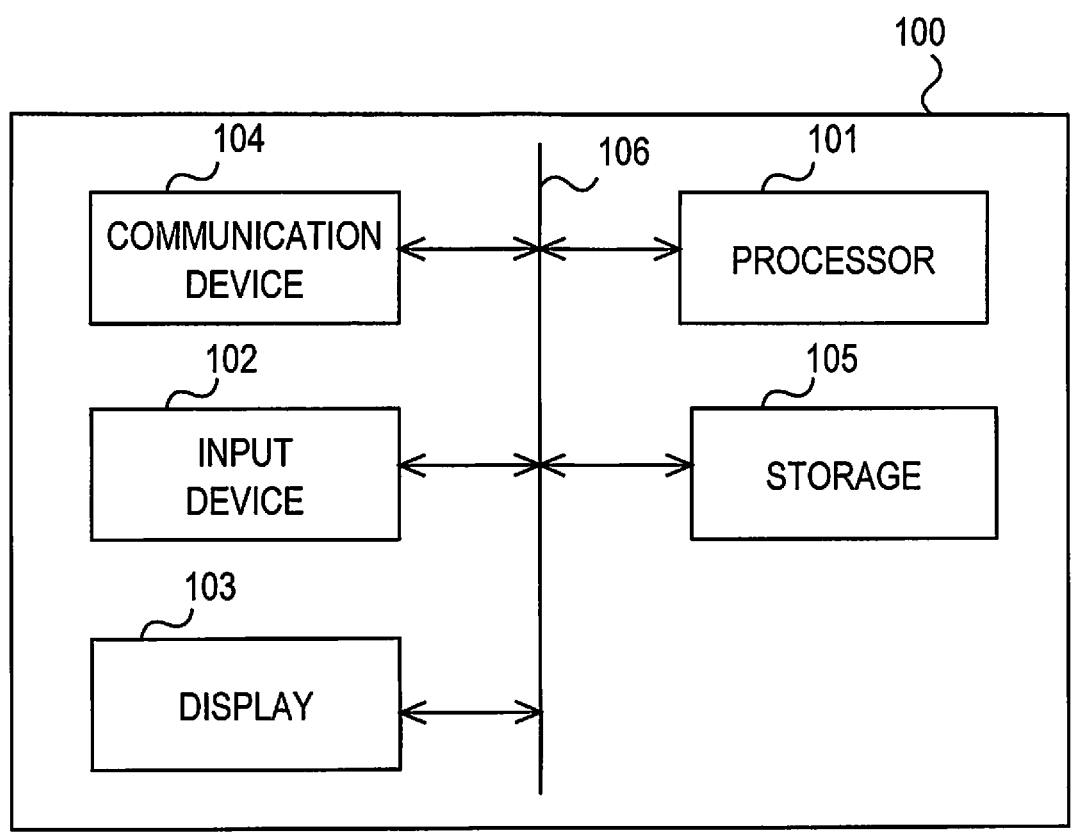
FIG. 7 is a block diagram of hardware in accordance with one or more embodiments.

FIG. 7 is an example of the computer 100. The computer 100 in FIG. 7 includes a processor 101, an input device 102, a display 103, a communication device 104 and a storage 105. The processor 101, the input device 102, the display 103, the communication device 104 and the storage 105 are connected to each other by a bus 106.

The processor 101 is an electric circuit including the controller and arithmetic unit of the computer 100. It is possible to use general purpose processors, central processing units (CPUs), microprocessors, digital signal processors, controllers, microcontrollers, state-machines, ASICs, FPGAs, PLDs or a combination of the above as the processor 101.

The processor 101 executes arithmetic operations by using data or programs provided from devices connected via the bus 106 (for example, the input device 102, the communication device 104 and the storage 105). Also, the processor 101 transmits the calculated results and control signals to the devices connected via the bus 106 (for example, the display 103, the communication device 104 and the storage 105). Specifically, the processor 101 executes the OS (the operation system) of the computer 100 and monitoring programs. Also, the processor controls various devices which configure the computer 100.

The monitoring program is a program which enables the computer 100 to operate as the aforementioned monitoring device. The monitoring program is stored in non-transitory storage medium which is readable by the computer. Examples of the storage medium Include optical discs, magnetic discs, magnetic tapes, flash memories and semiconductor memory. However, the type of storage medium is not limited. When the processor 101 executes the monitoring program, the computer 100 operates as the monitoring device.

The input device 102 is a device for entering information to the computer 100. Examples of the input device 102 include a keyboard, a mouse and touch panels. However, the type of device is not limited. By using the input device 102, the user specifies the sensors and devices whose anomalies the user wants to detect. The user also specifies the context variables and the content variables. The user also specifies the periods for the base data and the target data. The user also selects the method used for the variable selection process. The user also enters instructions for starting the contextual anomaly detection process by using the input device 102.

The display 103 displays graphics and videos. Examples of the display 103 include a LCD (liquid crystal display), CRT (cathode ray tube) or an organic electroluminescence display. However, the type of displays used is not limited. On the display 103, the result of data preprocessing and the locations where anomalies are detected is presented.

The communication device 104 enables the computer 100 to communicate with external devices via wireless or wired communication mediums. Examples of the communication device 104 include Network Interface Cards, communication modules, hubs and routers. However, the type of device is not limited. In one embodiment, the collector 2 gathers measured data from buildings where sensors are installed, via the communication device 104.

The storage 105 saves the operating system of the computer 100, the monitoring program, data necessary to execute the monitoring program and data generated by the monitoring program. The storage 105 includes the main storage device and the external storage device. Examples of the main storage device include RAM, DRAM and SRAM. However, the type of device used as the main storage device is not limited. Also, examples of the external storage device include HDD, optical discs, flash memory and magnetic tapes. However, the type of device used as the external storage is not limited. In one embodiment, the context database 3 and the content database 4 are configured on the storage 105. In another embodiment, the context database 3 and the content database 4 are configured on external servers or external storage.

In one embodiment, the computer 100 includes a plurality of processors 101, input devices 102, displays 103, communication devices 104 and storage 105. In another embodiment, the computer 100 is connected to peripheral devices such as printers or scanners.

In one embodiment, the monitoring device is configured with a single computer 100. In another embodiment, the monitoring device is configured with a plurality of computers which are connected to each other.

In one embodiment, the monitoring program is stored in the storage 105 of the computer 100. In another embodiment, the monitoring program is stored in the external storage. In one embodiment, the monitoring program is uploaded to the internet. By installing the monitoring program to the computer 100, the features of the monitoring device become executable.

Second Embodiment

In the monitoring device according to the first embodiment, the contribution score was calculated using an ensemble learning method. Then, based on the contribution scores of each variable, the variable selection process was executed. In the second embodiment, the variable selection process is based on a statistical test for context variables.

In the variable selection process according to the second embodiment, a nonparametric statistical test, which does not make assumptions about the probability distributions of the variables to be evaluated by the test, is used. Examples of nonparametric statistical tests include the Mann-Whitney U test. However, the type of statistical test is not limited. Thus, the statistical test for the variable selection process is not limited to nonparametric statistical tests.

In the following equation (10), elements of the matrix $X_a$ in equation (4) are shown explicitly.

$$X_a = \begin{bmatrix} b_{\{1,a1\}} & b_{\{1,a2\}} & b_{\{1,a3\}} & \cdots & b_{\{1,am\}} \\ b_{\{2,a1\}} & b_{\{2,a2\}} & b_{\{2,a3\}} & \cdots & b_{\{2,am\}} \\ \vdots & \vdots & \vdots & \vdots & \vdots \\ b_{\{n_a,a1\}} & b_{\{n_a,a2\}} & b_{\{n_a,a3\}} & \cdots & b_{\{n_a,am\}} \end{bmatrix} \in R^{n_a \times m} \quad (10)$$

In the following equation (11), the elements in the matrix $X_h$ corresponding to the target data in equation (6) are shown explicitly.

$$X_h = \begin{bmatrix} b_{\{1,h1\}} & b_{\{1,h2\}} & b_{\{1,h3\}} & \cdots & b_{\{1,hm\}} \\ b_{\{2,h1\}} & b_{\{2,h2\}} & b_{\{2,h3\}} & \cdots & b_{\{2,hm\}} \\ \vdots & \vdots & \vdots & \vdots & \vdots \\ b_{\{n_h,h1\}} & b_{\{n_h,h2\}} & b_{\{n_h,h3\}} & \cdots & b_{\{n_h,hm\}} \end{bmatrix} \in R^{n_h \times m} \quad (11)$$

Each row in equations (10) and (11) corresponds to the record including the context variables obtained in each time. Each column in equations (10) and (11) corresponds to the values of a context variable in a plurality of times. Both the matrix $X_a$ in equation (10) and the matrix $X_h$ in equation (11) include m context variables.

First, the variable selector according to the embodiment makes pairs of columns. The one column of the pair is selected from $X_a$ and. Another column of the pair is selected from $X_h$. Moreover, the columns in each pair correspond to the same context variable.

Then, a statistical test is applied to each pair of columns. In other words, the columns in each pair are compared by using a statistical test. If the result of the applied statistical test indicates that there is a significant difference between the columns, the corresponding context variable is excluded from the contextual anomaly detection by the anomaly detector 6. On the other hand, if the result of the applied statistical test indicates that there is not a significant difference between the columns, the corresponding context variable is selected as the variables use in the contextual anomaly detection by the anomaly detector 6. By executing the above process for all the pairs, it is possible to select the context variables which are used in the contextual anomaly detection executed by the anomaly detector 6.

Besides the differences in the process executed by the variable selector 5, the features and the configuration of the monitoring device according to the second embodiment are the same as the features and the configuration of the monitoring device according to the first embodiment.

Third Embodiment

In the monitoring devices according to the above embodiments, the variable selection process was executed for only the context variables. Thus, all the content variables were selected as the variables used in the contextual anomaly detection by the anomaly detector 6. However, it is possible to execute the variable selection process for the content variables as well. In the variable selector according to the third embodiment, the variable selection process for the context variables is executed first. Then, the variable selection process for the content variables is executed next. Regarding the variable selection process for the context variables, the methods described in the first embodiment or the methods described in the second embodiment are used.

Before explaining the variable selector according to the embodiment, the expression of the variables is explained. The following equation (12) is a matrix $Z_a$ of content variables used as the base data.

$$Z_a = \begin{bmatrix} s_{\{1,a1\}} & s_{\{1,a2\}} & s_{\{1,a3\}} & \cdots & s_{\{1,al\}} \\ s_{\{2,a1\}} & s_{\{2,a2\}} & s_{\{2,a3\}} & \cdots & s_{\{2,al\}} \\ \vdots & \vdots & \vdots & \vdots & \vdots \\ s_{\{n_a,a1\}} & s_{\{n_a,a2\}} & s_{\{n_a,a3\}} & \cdots & s_{\{n_a,al\}} \end{bmatrix} \in R^{n_a \times l} \quad (12)$$

The following equation (13) is a matrix $Z_h$ of content variables used as the target data.

$$Z_h = \begin{bmatrix} s_{\{1,h1\}} & s_{\{1,h2\}} & s_{\{1,h3\}} & \cdots & s_{\{1,hl\}} \\ s_{\{2,h1\}} & s_{\{2,h2\}} & s_{\{2,h3\}} & \cdots & s_{\{2,hl\}} \\ \vdots & \vdots & \vdots & \vdots & \vdots \\ s_{\{n_h,h1\}} & s_{\{n_h,h2\}} & s_{\{n_h,h3\}} & \cdots & s_{\{n_h,hl\}} \end{bmatrix} \in R^{n_h \times l} \quad (13)$$

Each row in the matrix $Z_a$ and the matrix $Z_h$ correspond to the record of the content variables obtained in each time. Both the matrix $Z_a$ and the matrix $Z_h$ include I (small case of L) content variables.

Next, the notations of the context data after the variable selection process for context variables are described. The following equation (14) denotes the context data of the base data after the variable selection process. The symbol m* in equation (14) denotes the number of the context variables after the variable selection process.

$$X_a^* = \begin{bmatrix} x_{\{1,a\}}^* \\ x_{\{2,a\}}^* \\ \vdots \\ x_{\{n_a,a\}}^* \end{bmatrix} \in R^{n_a \times m^*} \quad (14)$$

The following equation (15) denotes the context data of the target data after the variable selection process. The meaning of the symbol m* in equation (15) is same as the symbol m* in equation (14).

$$X_h^* = \begin{bmatrix} x_{\{1,h\}}^* \\ x_{\{2,h\}}^* \\ \vdots \\ x_{\{n_h,h\}}^* \end{bmatrix} \in R^{n_h \times m^*} \quad (15)$$

If the number of the context variables before the variable selection process for context variables is m, the relation, m*<=m holds. Below, the aforementioned notations are used to explain the variable selection process for content variables according to the third embodiment.

First, the matrix $X^*_a$ and the matrix $Z_a$ are concatenated in the column direction, generating the matrix $W_a$ described in equation (16) below.

$$W_a = \begin{bmatrix} b_{\{1,a1\}} & \cdots & b_{\{1,am^*\}} & s_{\{1,a1\}} & \cdots & s_{\{1,al\}} \\ \vdots & \ddots & \vdots & \vdots & \ddots & \vdots \\ b_{\{n_a,a1\}} & \cdots & b_{\{n_a,am^*\}} & s_{\{n_a,a1\}} & \cdots & s_{\{n_a,al\}} \end{bmatrix} \in R^{n_a \times (m^*+l)} \quad (16)$$

Similarly, the matrix $X^*_h$ and the matrix $Z_h$ are concatenated in the column direction, generating the matrix $W_h$ described in equation (17) below.

$$W_h = \begin{bmatrix} b_{\{1,h1\}} & \cdots & b_{\{1,hm^*\}} & s_{\{1,h1\}} & \cdots & s_{\{1,hl\}} \\ \vdots & \ddots & \vdots & \vdots & \ddots & \vdots \\ b_{\{n_h,h1\}} & \cdots & b_{\{n_h,hm^*\}} & s_{\{n_h,h1\}} & \cdots & s_{\{n_h,hl\}} \end{bmatrix} \in R^{n_h \times (m^*+l)} \quad (17)$$

Then, the matrix $W_a$ and the matrix $W_h$ are concatenated in the row direction, generating the matrix $W_c$ described in equation (18), below.

$$W_c = \begin{bmatrix} b_{\{1,a1\}} & \cdots & b_{\{1,am^*\}} & s_{\{1,a1\}} & \cdots & s_{\{1,al\}} \\ \vdots & \ddots & \vdots & \vdots & \ddots & \vdots \\ b_{\{n_a,a1\}} & \cdots & b_{\{n_a,am^*\}} & s_{\{n_a,a1\}} & \cdots & s_{\{n_a,al\}} \\ b_{\{1,h1\}} & \cdots & b_{\{1,hm^*\}} & s_{\{1,h1\}} & \cdots & s_{\{1,hl\}} \\ \vdots & \ddots & \vdots & \vdots & \ddots & \vdots \\ b_{\{n_h,h1\}} & \cdots & b_{\{n_h,hm^*\}} & s_{\{n_h,h1\}} & \cdots & s_{\{n_h,hl\}} \end{bmatrix} \in R^{(n_a+n_h)\times(m^*+l)} \quad (18)$$

Next, similar to the variable selection process in the first embodiment, the contribution score (the importance) of each content variable is calculated by classifiers such as random forest and Adaboost. In the calculation, the matrix $W_c$ in equation (18) is used as the explanatory variable and the vector $Y_c$ in equation (9) is used as the response variable. Classifiers used for the calculation of the contribution score are not limited. It is possible to use an indicator based on the permutation importance or the Gini impurity as the contribution score. However, the type of indicator used for the contribution score is not limited.

After the contribution score is calculated for each content variable, each contribution score is compared to a threshold value. If the contribution score of the content variable is less than the threshold value, the corresponding content variable is not used in the contextual anomaly detection by the anomaly detector 6. If the contribution score of the content variable is equal to or greater than the threshold value, the corresponding content variable is used during the contextual anomaly detection executed by the anomaly detector 6. The method used for determining the threshold value is not limited. For example, in one embodiment, the average value of the contribution scores for all the content variables is used as the threshold value.

If content variables in the base data and the target data behave similarly, the contribution scores for the content variables tend to take smaller values. The content variables which behave similarly in the base data and the target data help little when detecting anomalies in the monitored device/system. Such content variables in the anomaly detection process could reduce the accuracy of the anomaly detection. Thus, by excluding the content variables with small contribution scores, it is possible to improve the accuracy of the contextual anomaly detection by the anomaly detector 6. Also, by reducing the number of variables used in the anomaly detector 6, it is possible to reduce the workload required for executing the contextual anomaly detection process.

By executing the processes described above, the variable selection process according to the third embodiment is completed. In one embodiment, the variable selector 5 saves the information on excluded variables or the information on selected variables in the storage 105. In another embodiment, the information on excluded variables or the information on selected variables is transmitted to the anomaly detector 6. The anomaly detector 6 uses the variables (context variables and content variables) selected in the variable selection process while excluding the variables (context variables and content variables) which were not selected in the variable selection process from usage in the contextual anomaly detection process.

Besides the differences in the process executed by the variable selector 5, the features and the configuration of the monitoring device according to the third embodiment is the same as the features and the configuration of the monitoring devices according to the above embodiments. In the data preprocessing result and the contextual anomaly detection result shown in the example of FIG. 6, not only the context variables but also some of the content variables are excluded from usage. Thus, the screen of FIG. 6 is generated by the monitoring device according to the third embodiment.

Figure 8:
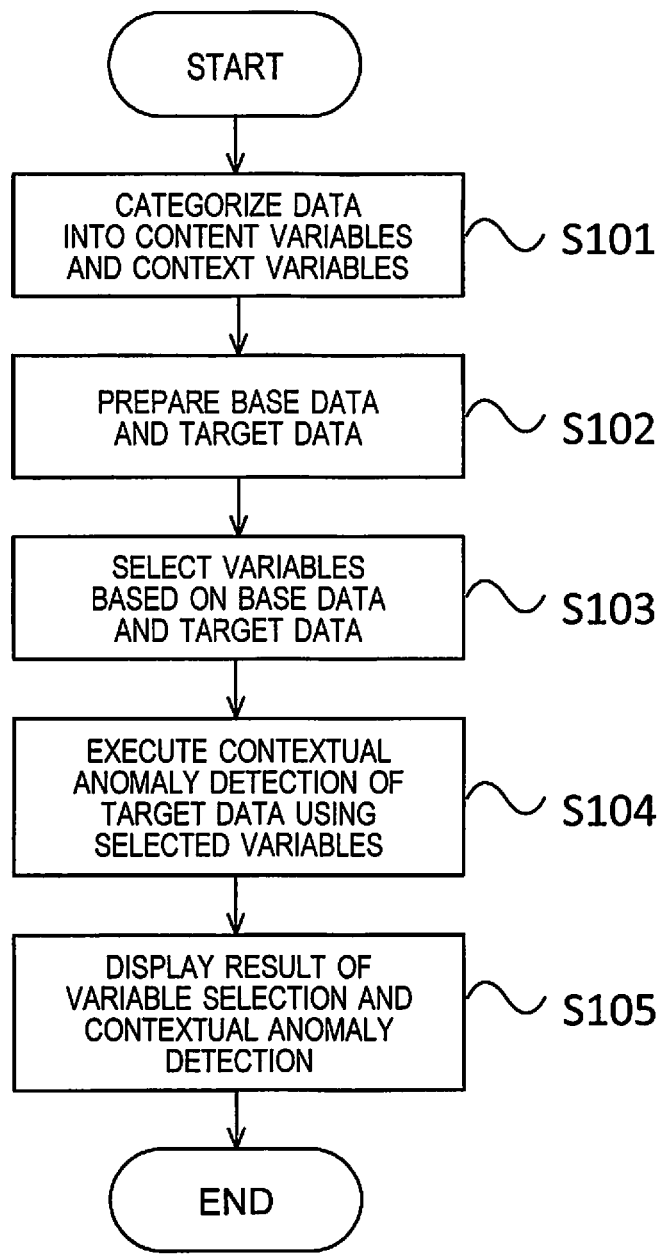
FIG. 8 is a flowchart of a process executed by the monitoring device.

Next, the process executed by the monitoring device according to the above embodiments is explained. FIG. 8 is a flowchart of a process executed by the monitoring device. In the following, the process is explained with reference to FIG. 8.

First, data is categorized into content variables and context variables (step S101). The data in step S101 is data entered into the monitoring device. The data after categorization is called the input data. Details of the variable categorization process were mentioned in the description of the collector 2.

Next, the base data and the target data are prepared (step S102). The definition of the base data and the target data were mentioned in the description of the context database 3. Then, the variable selection process is executed using the base data and the target data (step S103). The method used by the variable selector could be any of the methods described in the above embodiments. The details of the variable selection process were mentioned in the description of the variable selector 5 and the descriptions of the above embodiments.

Next, contextual anomaly detection of the target data is executed, using the selected variables (step S104). The details of the contextual anomaly detection process were mentioned in the description of the anomaly detector 6. Finally, the monitoring device displays the result of variable selection and contextual anomaly detection (step S105).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An information processing apparatus comprising:
   a hardware storage configured to store:
      base data including values of content variables and including values of context variables which indicate conditions when the content variables were obtained, and
      target data including values of the content variables and including values of the context variable; and
   processing circuitry configured to:
      calculate degree of contribution for distinguishing the context variables between the based data and the target data,
      select a context variable used for state detection in the target data from among the context variable, and
      perform the state detection in the target data using the selected context variables.

2. The information processing apparatus according to claim 1, wherein
   the base data is data obtained during a first period when a system or a device being monitored is in normal state.

3. The information processing apparatus according to claim 1, wherein
the processing circuitry is configured to select the context variables for which the degree of contribution for distinguishing the context variables is equal to or less than a first threshold value from among the context variables as the context variable used in the state detection.

4. The information processing apparatus according to claim 3, wherein
the processing circuitry is configured to:
calculate degree of contribution for distinguishing the content variables between the reference data and the target data based on the context variables in the base data, the content variables in the target data, and the context variable used for the state detection; and
select the content variables used for the state detection from among the content variables based on the degree of contribution for distinguishing the content variables.

5. The information processing apparatus according to claim 3, wherein
the processing circuitry is configured to calculate the degree of contribution for distinguishing the context variables by using an ensemble learning method.

6. The information processing apparatus according to claim 5, wherein
the ensemble learning method is a random forest method.

7. The information processing apparatus according to claim 1, wherein
the degree of contribution is either permutation importance or Gini importance.

8. The information processing apparatus according to claim 1, wherein
the processing circuitry is configured to execute a statistical test for each context variable in the base data and the target data, and configured to select the context variables for which there is no significant difference between the base data and the target data as the context variables used for the state detection.

9. The information processing apparatus according to claim 8, wherein
the statistical tests include nonparametric statistical tests.

10. The information processing apparatus according to claim 9, wherein
the statistical tests includes nonparametric statistical tests including Mann-Whitney U test.

11. The information processing apparatus according to claim 1, wherein the processing circuitry categorizes variables included in the base data and the target data to the content variables and the context variables.

12. The information processing apparatus according to claim 1, wherein
the processing circuitry is configured to perform the state detection in the target data using the base data;
wherein the base data and the target data each include the context variables and the content variables which are selected by the processing circuitry and not including the context variables and the content variables which are not selected by the processing circuitry.

13. The information processing apparatus according to claim 1, further comprising a display configured to display results of the state detection by the processing circuitry.

14. The information processing apparatus according to claim 13, wherein
the display is configured to display at least the context variables which are not used in the state detection or the content variables which are not used in the state detection.

15. The information processing apparatus according to claim 3, wherein
the processing circuitry is configured to select the content variable for which the degree of contribution for distinguishing the content variables is equal to or less than a second threshold value as the content variable used in the state detection.

16. The information processing apparatus according to claim 1, wherein the state detection is anomaly detection.

17. The information processing apparatus according to claim 1, wherein the reference data is obtained during a first period and the target data is obtained during a second period different from the first period.

18. An information processing method comprising the steps of:
providing:
base data including values of content variables and including values of context variables which indicate conditions when the content variables were obtained and
target data including values of the content variables and including variables of the context variables;
calculating degree of contribution for distinguishing of the context variables between the based data of the target data;
selecting a context variable used for state detection in the target data from among the context variables; and
performing the state detection in the target data using the selected context variable.

19. A non-transitory storage medium having a computer program stored therein which causes a computer to execute processes comprising:
providing base data including values of content variables and including values of context variables which indicate conditions when the content variables were obtained and
target data including values of the content variables and including values of the context variables;
calculating degree of contribution for distinguishing of the context variables between the based data and the target data;
selecting a context variable used for state detection in the target data from among the context variables; and
performing the state detection in the target data using the selected context variable.

* * * * *